(12) United States Patent
Weichmann et al.

(10) Patent No.: US 8,147,067 B2
(45) Date of Patent: Apr. 3, 2012

(54) LASER PROJECTION SYSTEM BASED ON A LUMINESCENT SCREEN

(75) Inventors: Ulrich Weichmann, Aachen (DE); Peter Schmidt, Aachen (DE); Gero Heusler, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 684 days.

(21) Appl. No.: 12/089,085

(22) PCT Filed: Sep. 26, 2006

(86) PCT No.: PCT/IB2006/053492
§ 371 (c)(1),
(2), (4) Date: Apr. 3, 2008

(87) PCT Pub. No.: WO2007/039850
PCT Pub. Date: Apr. 12, 2007

(65) Prior Publication Data
US 2008/0259431 A1    Oct. 23, 2008

(30) Foreign Application Priority Data
Oct. 4, 2005 (EP) .................................. 05109191

(51) Int. Cl.
*G03B 21/00* (2006.01)
*G02F 1/00* (2006.01)
(52) U.S. Cl. .................. 353/31; 348/754; 348/769
(58) Field of Classification Search .................. 353/31, 353/99; 348/754, 769
See application file for complete search history.

(56) References Cited

U.S. PATENT DOCUMENTS

| | | | | |
|---|---|---|---|---|
| 7,325,929 | B2 * | 2/2008 | Yavid et al. | 353/31 |
| 7,474,286 | B2 * | 1/2009 | Hajjar et al. | 345/81 |
| 2003/0142242 | A1 | 7/2003 | Yoon et al. | |
| 2004/0095970 | A1 | 5/2004 | Yamamoto et al. | |
| 2005/0001225 | A1 * | 1/2005 | Yoshimura et al. | 257/98 |
| 2005/0156496 | A1 * | 7/2005 | Takashima et al. | 313/237 |

FOREIGN PATENT DOCUMENTS

| | | |
|---|---|---|
| DE | 2004262 A1 | 8/1971 |
| EP | 0385705 A2 | 9/1990 |
| EP | 0635986 A1 | 1/1995 |
| EP | 0851263 A2 | 7/1998 |
| GB | 1306614 A | 2/1973 |
| JP | 2003287802 A | 10/2003 |
| JP | 2003330104 A | 11/2003 |
| WO | WO2004001483 A1 | 12/2003 |

* cited by examiner

*Primary Examiner* — Thanh X Luu
*Assistant Examiner* — Danell L Owens

(57) ABSTRACT

A laser projection system includes at least one laser light source, a projection screen and a spatial light modulator for projecting a laser beam of the laser light source to form an image on the projection screen. The projection screen includes a luminescent layer which upon excitation by the laser beam emits blue light. The luminescent layer contains $MSi_{6-a}Al_aN_{8-a}O_{x+a}:Eu^{2+}$ (with M=Sr, Ba,; $0 \leq x \leq 1$; $0 \leq a \leq 1$) as a luminescent material. With this material laser light of a laser diode emitting in the wavelength region of 405 nm can be converted to blue light of 450 nm with high efficiency. The proposed projection system, therefore, is suitable for RGB projection using laser diodes as laser light sources.

10 Claims, 1 Drawing Sheet

LASER PROJECTION SYSTEM BASED ON A LUMINESCENT SCREEN

Figure 1:
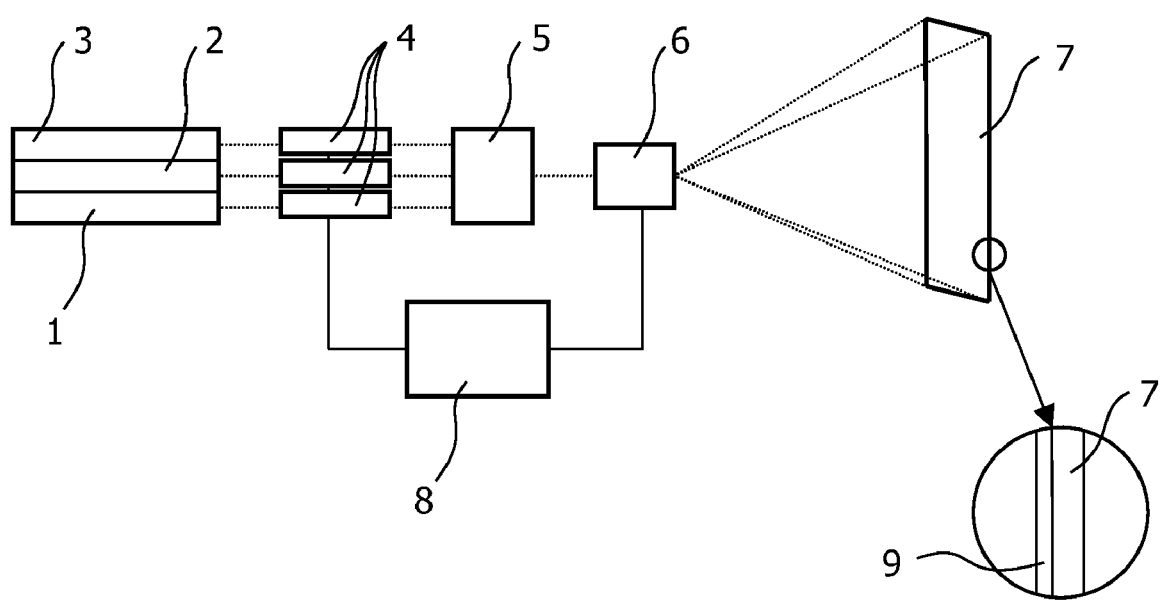

The present invention relates to a laser projection system consisting of at least one first laser light source, a projection screen and a spatial light modulator for projecting a laser beam of said laser light source to form an image on said projection screen, said projection screen comprising a luminescent layer which upon excitation by said laser beam emits blue light.

Projection is a very demanding application in terms of the optical Etendue. Short-arc lamps like the UHP-lamp or Xenon-lamps are used nowadays in order to provide a light source as point-like as possible. In common projection systems the light of the light source is projected via an optical light modulator on a projection screen while being modulated in intensity to form the desired image.

In terms of focusability, lasers provide a dramatic advantage, allowing for much smaller display sizes and therefore hold a huge cost-reduction potential. Several other advantages of lasers make them a highly desired light source for projection.

The lack of suitable laser light sources, in particular diode lasers at proper wavelengths in the visible wavelength range, is until now the major obstacle for laser-based projection systems. While red laser diodes are widely available for wavelengths ranging from 630 nm into the infrared region, efficient blue diodes are until now only available in ultraviolet and violet wavelength ranges, which are not suited for the human eye. For blue wavelengths of 450-465 nm required for RGB-displays (R: red, G: green, B: blue) no laser diodes with sufficient output power and efficiency can be found. Available modern laser projection systems therefore rely on rather involved laser sources that are bulky and expensive. For this reason, laser projection systems or laser displays are only used in high end applications and did not find a way to the consumer market, yet.

JP 2003-287802 discloses a laser projection system. In this projection system three laser light sources are provided, the beams of which are projected by a spatial light modulator to form an image on a projection screen. Two of the laser light sources emit light of two of the three colors required for RGB projection. The remaining color is emitted by a luminescent layer on the projection screen which is excited by the laser beam of the third laser light source, called excitation light source. In one of the embodiments disclosed in this document the excitation light source is a semiconductor laser that emits ultraviolet light, wherein the luminescent layer converts this ultraviolet light to blue light. As the basic material of this luminescent layer $Sr_{10}(PO_4)_6Cl_2$:Eu is proposed. This material, however, is not ideal for the use in a luminescent screen device. In such a device the excitation light source is preferably a 405 nm laser diode, since these diodes are readily available. At the wavelength of 405 nm, the luminescent material of the above document has only a small absorption resulting in poor conversion efficiency.

It is an object of the present invention to provide a laser projection system based on a luminescent screen which is able to efficiently convert laser light at least in the wavelength region of 405 nm to blue light.

The proposed laser projection system consists of at least one first laser light source, a projection screen and a spatial light modulator for projecting a laser beam of said first laser light source to form an image on the projection screen. The spatial light modulator may be any light modulator, known for example from other projection systems. The projection screen comprises a luminescent layer which upon excitation by said laser beam emits blue light. Said luminescent layer contains at least one of $BaMgAl_{11}O_{17}$:Eu or $MSi_{6-a}Al_a N_{8-a}O_{x+a}$:Eu$^{2+}$ (with M=Sr, Ba, Ca; $0 \leq x \leq 1$; $0 \leq a \leq 1$) as a luminescent material.

With the luminescent layer containing the above material, the laser light of a first laser light source emitting in the region of 405 nm is efficiently converted to a fluorescent or phosphorescent light in the region of 450-460 nm. The inventors of the present projection system found this material which surprisingly has significantly better conversion efficiency for an excitation wavelength of 405 nm than the known material of JP 2003-287802. Therefore, the present projection system allows the use of commercially available 405 nm laser diodes to produce blue light on the projection screen. The application of the luminescent layer to the projection screen can be done in several ways, e.g. by a coating technique, known to the skilled person. Preferably the proposed projection system comprises at least three different laser light sources, the first laser light source, a second laser light source and a third laser light source emitting at different wavelengths. Selecting the wavelength of the second and third laser light sources appropriately, a RGB laser projection system can be realized.

For the red image that has to be overlaid to the blue image on the projection screen in such a RGB projection system, a red laser diode can be used, based for example on the GaAs material system. For the green image, that has to be overlaid to the blue and the red image on the projection screen, a frequency doubled Nd:YAG laser or an up-conversion laser can be used for example.

It is also possible to generate the green or red light by the luminescent layer on the projection screen in the same manner as the blue light, i.e. by down-conversion. To this end, the luminescent layer has to contain a further material converting the light of the second or third laser light source to red or green light. Preferably, the second or third laser light source in such an embodiment emits ultraviolet or violet light. This light, naturally, must have a different wavelength than the light of the first laser light source. Furthermore, the two luminescent materials, the material for generating the blue light and the material for generating the red or green light must have absorption bands that differ, so that these materials are only exited by the light of the corresponding laser light source. One material must absorb the radiation from the first laser light source with preferable no absorption in the wavelength region of the second or third laser light source. The other material must absorb the radiation from the second or third laser light source with preferable no absorption in the wavelength region of the first laser light source.

Instead of down-conversion from ultraviolet or violet light to produce red or green light, a material can be used in the luminescent layer, which allows up-conversion to the green or red light. Using a laser diode emitting for example at a wavelength of 970 nm, an Er$^{3+}$-doped substance in the luminescent layer can very efficiently absorb two infrared photons and emit one green photon at 550 nm. Several very efficient phosphors of this type are available, for example, Er,Yb:NaYF$_4$; Er,Yb:YF$_3$; Er,Yb:BaYF$_5$; or Er$^{3+}$ doped ZBLAN glass (53 ZrF$_4$, 20 BaF$_2$, 4 LaF$_3$, 3 AlF$_3$, 20 NaF).

Preferably, for up-conversion and/or down-conversion laser diodes are used as laser sources in the present projection system that emit in the wavelength ranges between 360 and 440 nm and/or between 780 and 1200 nm. In particular, the first laser light source is preferably a GaN laser diode emitting in the wavelength region of 405 nm. Nevertheless also other laser diodes emitting in the violet or ultraviolet range, for example at 385 nm, can be used. For generating the red light and green light (green light by up-conversion), laser diodes based on the GaAs material system and emitting in the wavelength range from 630 nm up to the infrared range are preferred. Alternatively, the above ultraviolet or violet laser diodes are preferably used for generating the green light in connection with a down-converting luminescent material.

In the present description and claims the word "comprising" does not exclude other elements or steps as well as an "a" or "an" does not exclude a plurality. Also any reference signs in the claims shall not be construed as limiting the scope of these claims.

The following exemplary embodiment shows an example of the present laser projection system with reference to the accompanying FIGURE without limiting the scope of the invention. The FIGURE shows:

FIG. 1A schematic configuration of an example of the proposed laser projection system.

The enclosed FIG. 1 shows a schematic configuration of a laser projection system according to one example of the present invention. This laser projection system comprises a laser source unit with three laser diodes, a first GaN laser diode 1 emitting at a wavelength of 405 nm, a second GaAs laser diode 2 emitting at a wavelength of 630 nm and a third GaAs laser diode emitting at a wavelength of 970 nm. The laser beams of the three laser diodes pass intensity modulators 4 and then are combined in an appropriate beam combiner 5 to one combined laser light beam. This laser light beam is projected via a spatial light modulator 6, e.g. a two axis deflection scanner, on the projection screen 7. The intensity modulators 4 and the spatial light modulator 6 are controlled by a video control unit 8 in order to produce the desired pictures on the projection screen 7 as is known in the art.

In the present example the projection screen 7 is covered with a luminescent layer 9, as can be seen in the amplified detail of the FIGURE. The luminescent layer 9 covers the whole projection screen. This luminescent layer 9 contains a mixture of $SrSi_6N_8O:Eu^{2+}$ and $Er,Yb:NaYF_4$ as main components, which may be embedded in a suitable matrix material.

Due to this luminescent layer 9 the laser light from the first laser diode 1 is converted to blue light of 450-460 nm on the projection screen (down-conversion). On the other hand, the laser light emitted from the third laser diode 3 is converted to green light of a wavelength of 550 nm (up-conversion). Therefore the colors produced on the projection screen by the three laser diodes have the wavelengths of 630 nm (R), 550 nm (G) and 450-460 nm (B). This allows an RGB projection providing pictures of realistic colors to the viewer.

Such a projection system is an excellent alternative to lamp based projectors. The possibility to use laser diodes as light sources results in a very compact arrangement which can be realized at low costs. Since the conversion efficiency of the proposed material for the blue conversion and the high reflectivity of this material for red (and also green) wavelengths, a very bright picture can be projected.

LIST OF REFERENCE SIGNS 1 first laser diode
2 second laser diode
3 third laser diode
4 intensity modulators
5 beam combiner
6 spatial light modulator
7 projection screen
8 video control unit
9 luminescent layer

The invention claimed is:

1. A laser projection system comprising:
a first laser light source;
a projection screen; and
a spatial light modulator for projecting a laser beam of said first laser light source to form an image on said projection screen,
wherein said projection screen comprises a luminescent layer which emits blue light upon excitation by said laser beam, and wherein said luminescent layer comprises $MSi_{6-a}Al_aN_{8-a}O_{x+a}:Eu^{2+}$ (with M=Sr, Ba; $0 \leq x \leq 1$; $0 < a \leq 1$) as a luminescent material.

2. The laser projection system of claim 1, wherein said first laser light source is a laser diode emitting in a violet or ultraviolet wavelength region.

3. The laser projection system of claim 2, further comprising a second light source and a third laser light source, said first laser light source, said second laser light source and said third laser light source emitting different wavelengths.

4. The laser projection system of claim 3, wherein said second laser light source emits in a red wavelength range.

5. The laser projection system of claim 4, wherein third laser light source emits in a green wavelength range.

6. The laser projection system of claim 4, wherein said luminescent layer comprises a further luminescent material suitable for up-conversion of light in the infrared wavelength range to green light, wherein said third laser light source emits in an infrared wavelength range.

7. The laser projection system of claim 4, wherein said luminescent layer contains a further luminescent material suitable for down-conversion of light in the violet or ultraviolet wavelength range to green light, wherein said third laser light source emits in the violet or ultraviolet wavelength range.

8. The laser projection system of claim 3, wherein said third laser light source emits in a green wavelength range.

9. The laser projection system of claim 8, wherein said luminescent layer contains a further luminescent material suitable for up-conversion of light in an infrared wavelength range to red light, wherein said second laser light source emits in the infrared wavelength range.

10. The laser projection system of claim 4, wherein said second laser light source is a laser diode.

* * * * *